United States Patent
Erdtmann

(10) Patent No.: US 12,325,284 B2
(45) Date of Patent: Jun. 10, 2025

(54) ROAD CONSTRUCTION MACHINE WITH NEBULIZER

(71) Applicant: JOSEPH VOEGELE AG, Ludwigshafen/Rhein (DE)

(72) Inventor: Bernhard Erdtmann, Edingen Neckarhausen (DE)

(73) Assignee: Joseph Voegele AG, Ludwigshafen/Rhein (DE)

(*) Notice: Subject to any disclaimer, the term of this patent is extended or adjusted under 35 U.S.C. 154(b) by 227 days.

(21) Appl. No.: 17/956,969

(22) Filed: Sep. 30, 2022

(65) Prior Publication Data

US 2023/0096356 A1 Mar. 30, 2023

(30) Foreign Application Priority Data

Sep. 30, 2021 (EP) ..................................... 21200171

(51) Int. Cl.
*B60H 1/32* (2006.01)
*E01C 19/48* (2006.01)

(52) U.S. Cl.
CPC ............... *B60H 1/32* (2013.01); *E01C 19/48* (2013.01); *B60H 2001/3286* (2013.01)

(58) Field of Classification Search
CPC .......... B60H 1/32; B60H 1/34; B60H 1/3202; B60H 1/3235; B60H 2001/3286; B60H 2001/3485; B60H 2001/2278; E01C 19/48; E01C 2301/50
See application file for complete search history.

(56) References Cited

U.S. PATENT DOCUMENTS

| 5,613,371 A | 3/1997 | Nelson |
| 7,632,038 B2 | 12/2009 | Buschmann et al. |
| 2002/0074674 A1* | 6/2002 | Keeney ............... B01F 23/2132 261/DIG. 4 |
| 2011/0022226 A1* | 1/2011 | Petersen ............ B60H 1/00407 700/237 |
| 2018/0030673 A1* | 2/2018 | Martin .................... B08B 15/00 |
| 2018/0066404 A1 | 3/2018 | Herzberg et al. |

FOREIGN PATENT DOCUMENTS

| CN | 205975302 U | 2/2017 |
| CN | 106975298 A | 7/2017 |
| CN | 219430457 U | 7/2023 |
| EP | 1 925 736 A1 | 5/2008 |

(Continued)

OTHER PUBLICATIONS

English translation of Hayashi (JP 2011089257 A) (Year: 2011).*

(Continued)

*Primary Examiner* — Miguel A Diaz
(74) *Attorney, Agent, or Firm* — Brooks Kushman P.C.

(57) ABSTRACT

A road construction machine in the form of a road finisher or feeder vehicle comprising an operator stand with a floor surface as a tread surface and a cooling system for producing a mist from a cooling agent. The cooling system comprises a tank for receiving the cooling agent and a spray apparatus for nebulizing the cooling agent into a mist. The cooling system is configured to produce the mist in the area of the operator stand, and the spray apparatus is arranged thereby at a height of at least 1.7 m above the tread surface.

19 Claims, 2 Drawing Sheets

(56) References Cited

FOREIGN PATENT DOCUMENTS

| | | |
|---|---|---|
| EP | 2119831 A1 | 11/2009 |
| EP | 3 276 081 A1 | 1/2018 |
| EP | 3 293 310 A1 | 3/2018 |
| EP | 3 276 081 B1 | 3/2020 |
| JP | 2011089257 A | 5/2011 |
| JP | 6793993 B1 | 12/2020 |

OTHER PUBLICATIONS

Third Party Observation, Application No. EP 21200171.3, Applicant: Joseph Voegele AG, dated Jan. 8, 2024, Communication under Rule 114 (2) EPC dated Jan. 15, 2024 (with English machine translation) (10 pages).
Final Office Action, Application No. JP 2022-155844, Applicant: Joseph Voegele AG, dated Mar. 5, 2024 (with English machine translation ) (6 pages).
European Search Report Dated Mar. 4, 2022, Application No. 21200171.3-1002, Applicant Joesph Voegele AG, 5 Pages.
Japanese Office Action (with English Machine Translation) Dated Sep. 1, 2023, Application No. 2022-155844, 8 Pages.
Chinese Office Action and Search Report, CN Application No. 202211210371.3, dated Apr. 30, 2025 (with English machine translation) (14 pages).

* cited by examiner

ROAD CONSTRUCTION MACHINE WITH NEBULIZER

CROSS-REFERENCE TO RELATED APPLICATIONS

This application claims foreign priority benefits under 35 U.S.C. § 119(a)-(d) to European patent application number EP 21200171.3, filed Sep. 30, 2021, which is incorporated by reference in its entirety.

TECHNICAL FIELD

The disclosure relates to a road construction machine in the form of a road finisher or a feeder vehicle for supplying a road finisher.

BACKGROUND

When asphalt is paved with road finishers or feeder vehicles for road finishers, it typically has temperatures of 160° C. to 180° C., for example, in order to be processed optimally. This means that operators of such road construction machines may be exposed to rather high temperatures while working. Further complicating matters, roads are also paved in summer or in regions where outside temperatures are already quite high. Air conditioning is not possible so long as the operator stand on the road construction machine is not arranged within an enclosed cabin.

EP 3 276 081 B1 describes a road finisher with a nebulizing apparatus for cooling agent. The nebulizing apparatus, however, deliberately has no effect on the temperature surrounding the operator stand. Rather, the mist of the cooling agent produced by the nebulizing apparatus should reach a maximum height of 1.5 m above the ground and has the purpose of binding aerosols in asphalt vapors right at the ground. This is intended to protect the operator from the rising aerosols. The spread of the mist above a height of 1.5 m above the ground should be purposefully avoided, however, as EP 3 276 081 B1 is afraid of otherwise obstructing the operator's view.

SUMMARY

An object of the present disclosure is to make work more comfortable for an operator of a road construction machine.

This object is solved by a road construction machine according to the disclosure.

According to the disclosure, a cooling system with a tank for receiving the cooling agent and a spray apparatus for nebulizing the cooling agent into a mist is provided. The cooling system is set up to produce the mist in the area of the operator stand—i.e., in the space where the operator is typically found during operation of the road finishing machine. This differentiates the disclosure from the state of the art, as conventionally the mist had only been produced as close as possible to the ground.

Furthermore, the disclosure provides that the spray apparatus is arranged at a height of at least 1.7 m above the tread surface. Since the tread surface is on the road construction machine and therefore, of course, above ground level, for example, at a height of 30 cm to 80 cm or even (on the main operator stand) at a height of between 1.5 m and 2.5 m, depending on the type of operator stand, the spray apparatus is positioned even higher in relation to the level of the substrate. This has the effect that the mist is produced above the operator stand and remains in the area of the operator stand for a comparative length of time. The mist ensures that the surroundings are cooled by evaporative cooling (adiabatic cooling). The term "cooling system" relates to this form of cooling and does not require active cooling of the cooling agent itself, even when this is conceivable in principle. Cooling the surroundings by means of evaporative cooling makes work less strenuous for the operator and enormously increases the operator's ability to concentrate, so that he is not so quickly exhausted, especially on hot days or in hot regions. Furthermore, embodiments of the disclosure have the positive effect that the mist binds particles such as dust. In contrast to the concern expressed in EP 3 276 081, the operator's view is not obstructed, but is actually improved.

Preferably, the spray apparatus is arranged at a height of at least 1.9 m above the tread surface or at a height of at least 2.1 m above the tread surface. This allows the mist to reach a comparatively large area without becoming too strongly diluted.

Preferably, the road construction machine does not have an enclosed cabin for the operator stand. In the case of an enclosed cabin, air conditioning would more likely be used in order to lower the temperature.

According to the disclosure, however, the operator stand may comprise a roof that is supported by a support structure, wherein the spray apparatus is mounted on the roof or on the support structure. This has the advantage that, on the one hand, the spray apparatus is always arranged above the operator's head and the operator's view is not obstructed. In addition, mounting of the spray apparatus is simplified by taking advantage of the support structure that is already present for the roof.

In a practical variant of the disclosure, the cooling system may be modularly detachable from the road construction machine or mounted on the road construction machine. This allows for the cooling system to be used only when necessary, for example in the summer. In the remaining time, the cooling system is not worn down and the space occupied by the cooling system can be used for other purposes.

It is conceivable that the cooling system is supplied with electrical energy by a power supply of the road construction machine, for example by a generator coupled to the engine of the road construction machine. This is advantageous in that the cooling system does not require its own energy supply.

The cooling agent may preferably be water, as it has a high heat capacity on the one hand and does not pose any environmental risks for the operator on the other.

In a further development, the degree of nebulization achievable by the spray apparatus or an average droplet size of the mist produced by the spray apparatus is adjustable. In this way, the operator can influence the cooling performance.

It is conceivable that, in one variant, the operator stand is an external operator stand on a paving screed of the road construction machine designed as a road finisher. This is particularly advantageous because the operator at the outside operator stand has to work particularly close to the hot asphalt.

In this case, a special structure, for example a vertical bar or frame, may be arranged at the external operator stand to support the spray apparatus.

It may be practical for the spray apparatus to be arranged further forward in the direction of travel of the road construction machine than a center point of the operator stand. This ensures that the greatest concentration of mist is in the area of the operator at the operator stand, even when taking any movement of the road construction machine during operation into consideration.

In one variant of the disclosure, the spray apparatus may not only have one, but several spray nozzles, in order to increase the space occupied by the mist.

BRIEF DESCRIPTION OF THE DRAWINGS

In the following, advantageous embodiments of the disclosure are explained in more detail with reference to a drawing.

The same components are designated with the same reference signs throughout the figures.

DETAILED DESCRIPTION

Figure 1:
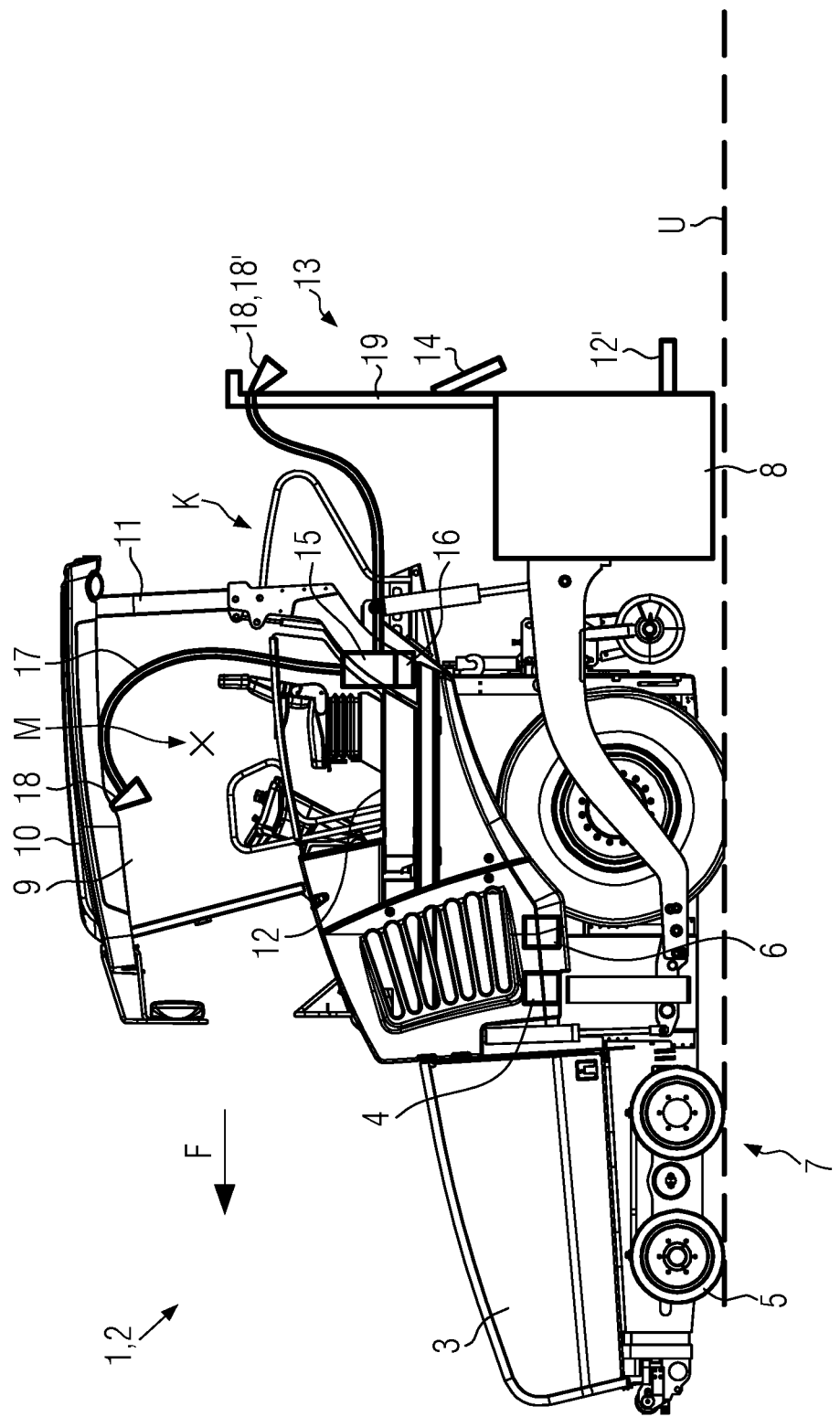
FIG. 1 is a lateral view of a road construction machine according to the disclosure in the form of a road finisher.

FIG. 1 shows a road finishing machine 1 in the form of a road finisher 2 for paving a road. In a typical manner, the road finisher 2 has a material hopper 3 for receiving paving material, for example hot asphalt, an engine 4—for example an internal combustion engine—for operating, in particular, a chassis 5, a generator 6 driven by the engine 4, and a towing vehicle 7 that tows a paving screed 8. The main operator stand 9 has a tread surface 12 for the operator to stand on.

A further operator stand, namely the external operator stand 13, is located on the paving screed 8. It has operator element 14 and its own tread surface 12' for the operator to stand on.

According to the disclosure, the road finisher 2 also has a cooling system K. The cooling system comprises a tank 15 for receiving a cooling agent 16, which may, for example, be water. The cooling system K may be supplied with electrical energy from the generator 6 to operate a pump and/or a cooling apparatus. The cooling system K may either be permanently installed on the road finisher 2 or modularly detachable from or mounted on the road construction machine 1.

The cooling system K has pipes 17 beside the tank 15, which lead the cooling agent from the tank to one more spray nozzles 18. A spray apparatus 18 serves to nebulize the cooling agent 16 into a fine mist. For this purpose, the spray apparatus 18 may have one more nozzles, which nebulize the cooling agent 16 into drops. The cooling system K may also have a pump (not shown), with which the cooling agent is transported from the tank 15 to the spray apparatus 18.

In the illustrated embodiment, a first spray apparatus 18 is mounted on the roof 10 of the road construction machine 1; it is located there with a height of over 1.9 m, and even over 2.1 m above the floor or tread surface 12 of the main operator stand 9. The tread surface 12 itself is already located at a height between 1.5 m and 2.3 m above a substrate U on which the road construction machine stands. In the typical direction of travel F of the road construction machine 1, the spray apparatus 18 is arranged further forward than a midpoint designated with an M of operator stand 9. The pipes 17 may be fastened to the support structure 11 and to the roof 10 with appropriate fasteners.

On the external operator stand 13, a separate structure 19 for supporting the spray apparatus 18 is provided, wherein the structure 19 may be fastened to the paving screed 8. The floor or tread surface 12' of the external operator stand 13 is already at a height of, for example, 30 cm to 50 cm above the substrate U.

Figure 2:
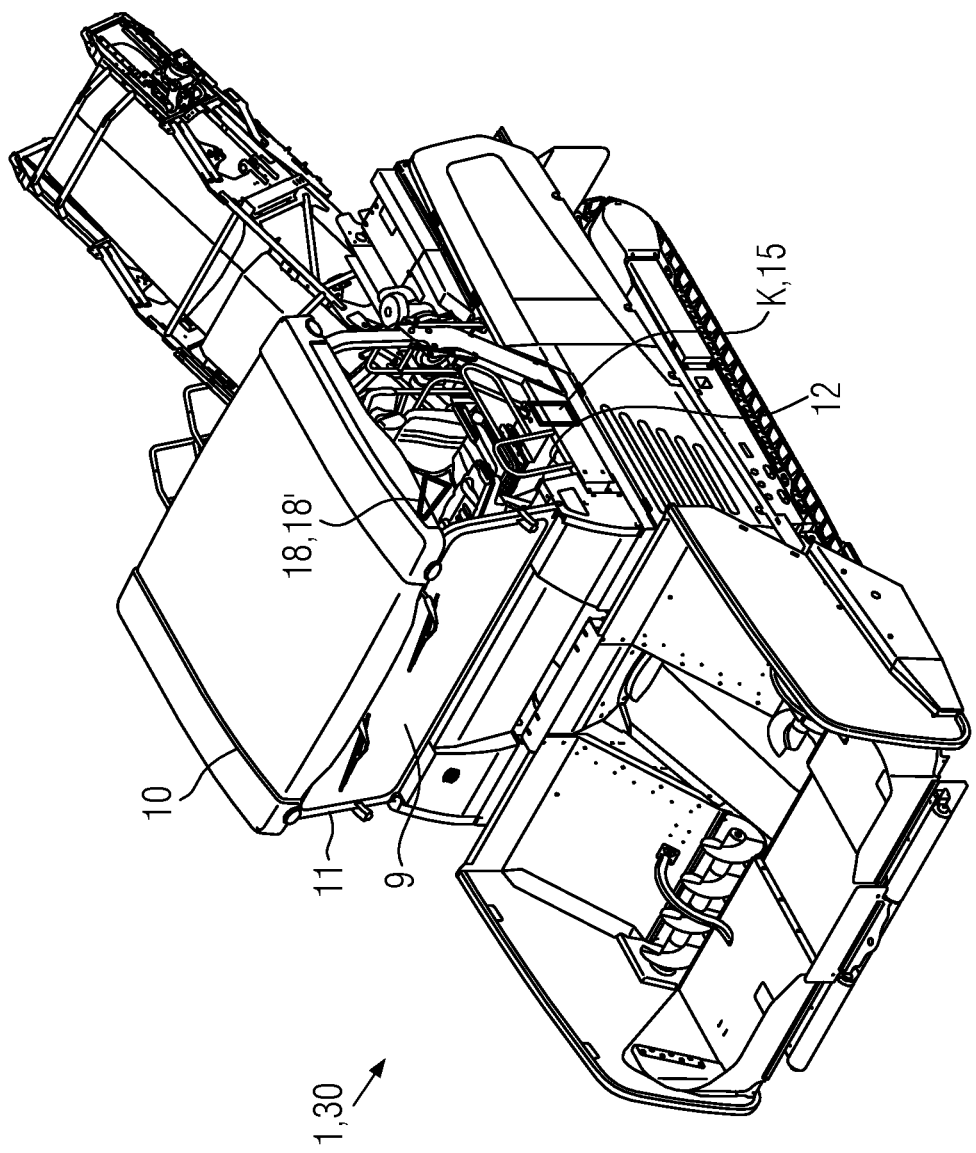
FIG. 2 shows an embodiment of the disclosure in the form of a feeder vehicle.

FIG. 2 shows a perspective view of a second embodiment of a road construction machine in the form of a feeder vehicle 30 with which a road finisher 2 may be supplied with asphalt. The feeder vehicle 30 has a main operator stand 9 analogous to the operator stand 9 of the road finisher shown in FIG. 1. In FIG. 2, the tank 15 of the cooling system K and a spray nozzle 18' fastened to the roof 10 as the spray apparatus 18, as well as the tread surface 12 of the operator stand 9, are only indicated schematically. Otherwise, the features of the cooling system 2 on the feeder vehicle may relate to those of the cooling system K explained with reference to FIG. 1.

What is claimed is:

1. A road construction machine formed as a road finisher for paving a road surface or a feeder vehicle for supplying the road finisher with paving material, the road construction machine comprising an operator stand with a floor surface as a tread surface for an operator, and a cooling system for producing a mist from a cooling agent, wherein the cooling system comprises a tank for receiving the cooling agent and a spray apparatus for nebulizing the cooling agent into a mist, the cooling system is configured to produce the mist in an area of the operator stand, and the spray apparatus is arranged at a height of at least 1.7 m above the tread surface, and wherein the road construction machine further comprises a material hopper for receiving paving material.

2. The road construction machine according to claim 1, wherein the spray apparatus is arranged at a height of at least 1.9 m above the tread surface.

3. The road construction machine according to claim 1, wherein the spray apparatus is arranged at a height of at least 2.1 m above the tread surface.

4. The road construction machine according to claim 1, wherein the operator stand comprises a roof supported by a support structure, wherein the spray apparatus is mounted on the roof or on the support structure.

5. The road construction machine according to claim 1, wherein the cooling system is modularly detachable from or mounted on the road construction machine.

6. The road construction machine according to claim 5, wherein the cooling system may be supplied with electrical energy from a power supply of the road construction machine.

7. The road construction machine according to claim 1, wherein the cooling agent comprises water.

8. The road construction machine according to claim 1, wherein a degree of nebulization of the spray apparatus or an average droplet size of the mist is adjustable.

9. The road construction machine according to claim 1, wherein the operator stand is an external operator stand on a paving screed of the road construction machine designed as a road finisher.

10. The road construction machine according to claim 9, further comprising a structure supporting the spray apparatus, wherein the structure is arranged on the external operator stand.

11. The road construction machine according to claim 1, wherein the spray apparatus is arranged further forward of a midpoint of the operator stand in a direction of travel of the road construction machine.

12. The road construction machine according to claim 1, wherein the spray apparatus is arranged further forward in a direction of travel of the road construction machine than the operator stand.

13. The road construction machine according to claim 1, wherein the spray apparatus comprises several spray nozzles.

14. The road construction machine according to claim 1, wherein the road construction machine is formed as the road finisher.

15. The road construction machine according to claim 14, wherein the road finisher comprises a paving screed.

16. The road construction machine according to claim 1, wherein the road construction machine is formed as the feeder vehicle.

17. A road construction machine formed as a road finisher for paving a road surface or a feeder vehicle for supplying the road finisher with paving material, the road construction machine comprising:
   an operator stand with a floor surface as a tread surface for an operator; and
   a cooling system for producing a mist from a cooling agent, wherein the cooling system comprises a tank for receiving the cooling agent and a spray apparatus for nebulizing the cooling agent into a mist, the cooling system is configured to produce the mist in an area of the operator stand, and the spray apparatus is arranged at a height of at least 1.7 m above the tread surface;
   wherein when the road construction machine is formed as the road finisher, the road finisher comprises a material hopper and a paving screed, and when the road construction machine is formed as the feeder vehicle, the feeder vehicle comprises a material hopper for receiving paving material, and the feeder vehicle is configured to supply the paving material to the material hopper of the road finisher.

18. The road construction machine according to claim 17, wherein the road construction machine is formed as the road finisher.

19. The road construction machine according to claim 17, wherein the road construction machine is formed as the feeder vehicle.

* * * * *